H. C. CLAY.
POWER STEERING GEAR FOR TRACTION ENGINES.
APPLICATION FILED DEC. 26, 1912.

1,072,824.

Patented Sept. 9, 1913.

2 SHEETS—SHEET 1.

Witnesses:
W. L. Dow
E. Behel.

Inventor:
Harry C. Clay,
By A. D. Behel
Atty.

H. C. CLAY.
POWER STEERING GEAR FOR TRACTION ENGINES.
APPLICATION FILED DEC. 26, 1912.
1,072,824.
Patented Sept. 9, 1913.
2 SHEETS—SHEET 2.
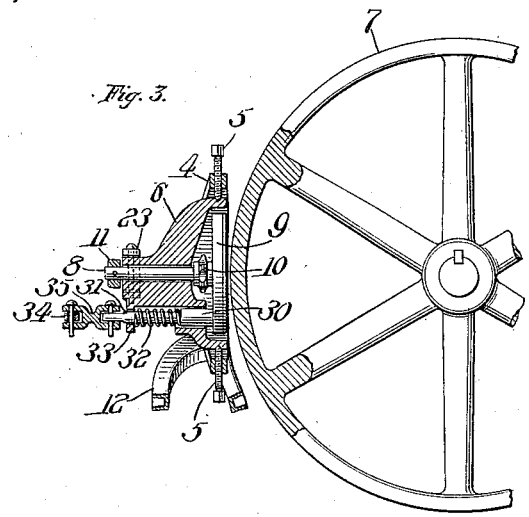
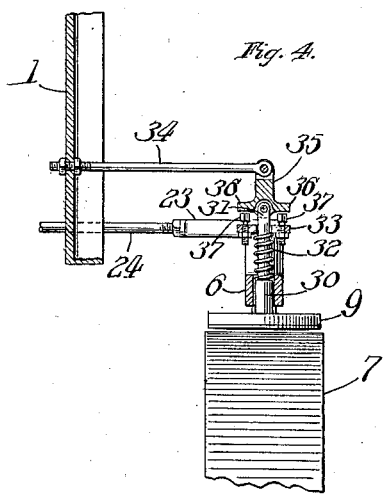
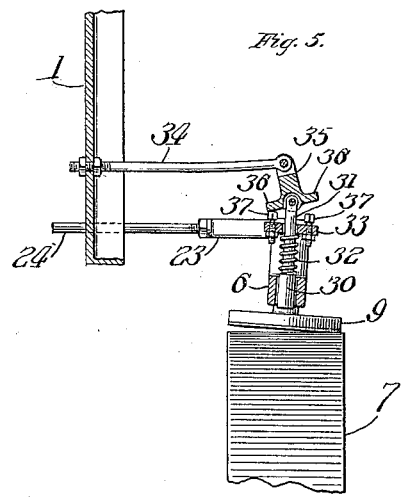
Witnesses:
W. L. Dow.
E. Behel.
Inventor:
Harry C. Clay
By A. O. Behel
Atty.

UNITED STATES PATENT OFFICE.

HARRY C. CLAY, OF COLUMBUS, INDIANA, ASSIGNOR TO EMERSON-BRANTINGHAM COMPANY, OF ROCKFORD, ILLINOIS, A CORPORATION OF ILLINOIS.

POWER STEERING-GEAR FOR TRACTION-ENGINES.

1,072,824.     Specification of Letters Patent.     Patented Sept. 9, 1913.

Application filed December 26, 1912. Serial No. 738,736.

*To all whom it may concern:*

Be it known that I, HARRY C. CLAY, a citizen of the United States, residing at Columbus, in the county of Bartholomew and State of Indiana, have invented certain new and useful Improvements in Power Steering-Gear for Traction-Engines, of which the following is a specification.

This invention relates to power steering-gears for traction engines such as described in my patent for same No. 797,557, dated Aug. 22, 1905.

The object of this invention is to improve the working of said device by providing means for frictionally engaging the disk member when said member is not in an operative position, that is, when not in engagement with the peripheral surface of an engine-pulley.

Figure 1:
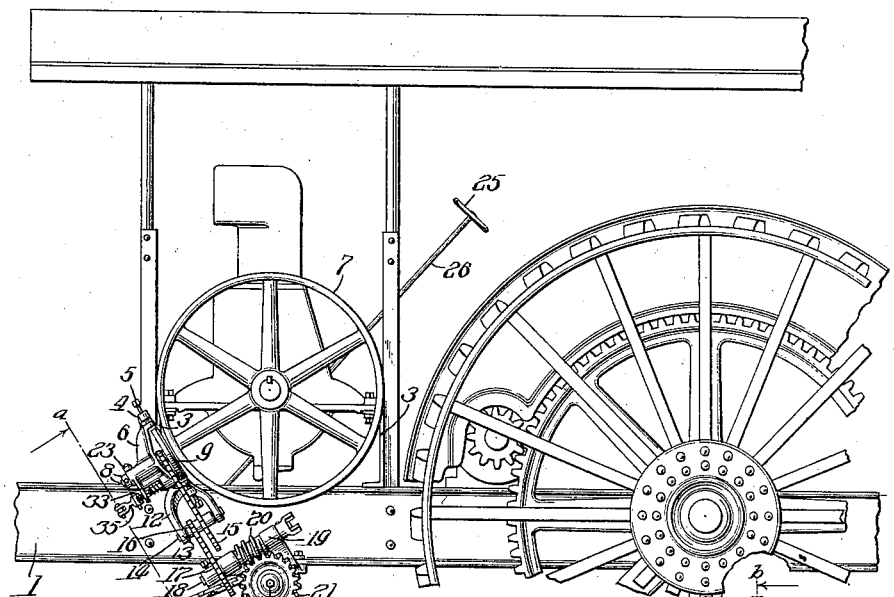
Figure 2:
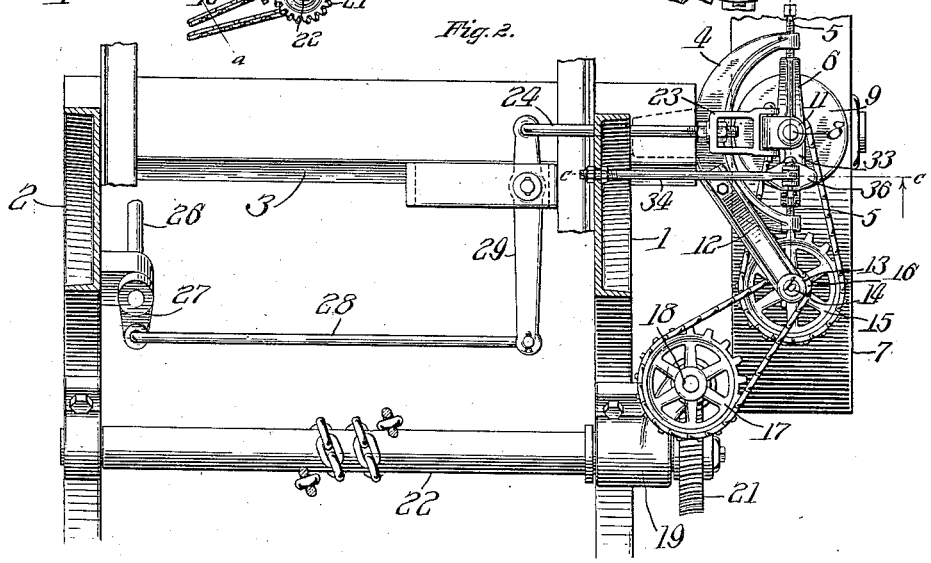

In the accompanying drawings: Figure 1 is a side elevation showing the application of the steering device to a traction engine. Fig. 2 is an enlarged section on the line *a—a* of Fig. 1. Fig. 3 is a section on the line *b—b* of Fig. 2. Fig. 4 is a section on the line *c—c* of Fig. 2, showing the friction plunger engaging the friction disk. Fig. 5 is a similar section showing the friction disk pivoted, engaging the peripheral face of the engine-pulley and the plunger released from contact with the disk.

The steering device may be suitably attached to the traction engine in order to get the friction disk in the desired position relative to the engine-pulley. The traction engine is shown fragmentarily to show such convenient support, and the frame thereof comprises the longitudinal channel-sides 1 and 2 and transverse channel-beams 3.

A yoked frame 4, fixedly secured to one of the channel-beams 3, carries the oppositely positioned pivot-screws 5 which screws pivotally support a disk-bracket 6. Journaled in the disk-bracket on an axis substantially radial with the center of the engine-pulley 7 is the shaft 8, carrying fixedly therewith the friction-disk 9 and sprocket-pinion 10, the shaft 8 being held from longitudinal displacement by the collar 11. A yoked bracket 12 is bolted to the frame 4 and supports in the journal bearings 13 at its ends a shaft 14, which fixedly carries the sprocket-gear 15 running in alinement with the sprocket-pinion 10, and the sprocket-pinion 16. An endless chain connects said sprocket gear and pinion. The sprocket-pinion 16 is connected by an endless chain with the sprocket-gear 17 fixedly mounted on shaft 18 which is journaled in the bracket 19 bolted to side channel-beam 1. The worm 20 secured to shaft 18 drives with worm-gear 21 and drives the chain shaft 22 which has the usual chain connection with the guide wheel truck.

Pivotally connected to the head of disk-bracket 6 is the bifurcated link 23 which has an adjustable connection with the rod 24. The hand-wheel 25 is secured to shaft 26 and movement is imparted from said shaft to rod 24 through the medium of crank 27 secured to shaft 26, rod 28, and rocking lever 29 pivotally supported and having connection with rod 24.

A plunger 30 having a reduced shank 31 is slidably carried by the disk-bracket 6, parallel with shaft 8 and a spring 32 coiled about shank 31 is compressed between the shoulder of plunger 30 and the lateral extension 33 of the disk-bracket 6, and holds the plunger yieldingly into engagement with the back of the friction-disk 9 at a point near the peripheral edge of said disk. A rod 34 bolted to channel-beam 1 has a pivotal connection with the top of the T-link 35 which has laterally extending ears 36, the ears being adapted when the friction-disk is pivoted, to contact the heads of the screws 37 carried by the lateral extension 33 of the disk-bracket.

The operation of the friction-disk and plunger is as follows: The steering device excepting as to Fig. 5, is shown in its normal inoperative position. The operator by turning hand-wheel 25 to the left, pivots the disk-bracket 6 through the medium of the lever connection above described, so that the outer circular portion of the face of disk 9 is brought into frictional contact with the peripheral face of the engine-pulley 7, as shown in Fig. 5, thereby revolving said disk and likewise the chain-shaft 22 through the medium of the chain connections and drive therewith. As seen in Fig. 5, when the disk-bracket is thus pivoted one of the ears 36 will contact the adjacent screw-head 37, causing the T-link 35 to fulcrum from said contact point and raise the plunger 30 against the action of spring 32, thereby disconnecting the frictional engagement between the plunger and disk and allowing the disk to be rotated by the engine-pulley. When in a steering device of this sort without the disk stop, the guide wheel has been sufficiently turned and the hand-wheel 25 operated to bring the several parts back to their normal position, the momentum of the friction-disk received by its contact with the engine-pulley, causes it to continue rotating for a short time thereby not making the steering absolutely positive. But with my improved device the moment the friction disk is disengaged from the engine-pulley, the plunger 30, through the action of bringing the parts back to their normal position by the hand-wheel 25, and also by the aid of spring 32, is instantly brought into frictional contact with the back face of the rotating disk, thereby stopping such rotation and rendering the action of the steering absolutely positive. It will be seen also that the tensional action of spring 32 coöperates in holding the several parts in their normal position, also holding the disk face parallel with the face of the engine-pulley thereby disengaged from said pulley. Turning the hand-wheel to the right causes the friction-disk to engage the opposite side of the engine-pulley thereby reversing the direction of rotation of said disk, likewise the direction of the guide-wheel truck, and operates the disk stopping parts in a similar manner to that above described, the T-link being pivoted oppositely to that shown. But slight movement of hand-wheel 25 is necessary to turn the guide-wheel truck in either direction, as will be evidenced by the direct connections to and from the friction-disk and also because of the novel provision for securing positive action of said disk.

I claim as my invention:

1. A power steering-gear attachment for traction engines consisting of a main bracket adapted to be suitably connected to a traction engine, a disk-bracket pivotally mounted on the main bracket, a friction-disk journaled in said disk bracket and provided with a friction face, a plunger carried by the disk-bracket and adapted to be brought into frictional contact with said disk, and a driving connection between said disk and the steering means of a traction engine.

2. A power steering-gear attachment for traction engines consisting of a main bracket adapted to be suitably connected to a traction engine, a disk-bracket pivotally mounted on the main bracket, a friction-disk journaled in said disk-bracket and provided with a friction face, means for swinging the disk-bracket on the main bracket, means for frictionally contacting said disk when the disk is in an operative position, and a driving connection between said disk and the steering means of a traction engine.

3. A power steering-gear attachment for traction engines consisting of a main bracket adapted to be suitably connected to a traction engine, a disk-bracket pivotally mounted on the main bracket, a friction-disk journaled in said disk-bracket and provided with a friction face, means for swinging the disk-bracket on the main bracket, means for frictionally contacting said disk when the disk is in an inoperative position, said last mentioned means being adapted to hold the disk-bracket in an inoperative position, and a driving connection between said disk and the steering means of a traction engine.

4. A power steering- gear attachment for traction engines consisting of a main bracket adapted to be suitably connected to a traction engine, a disk-bracket pivotally mounted on the main bracket, a friction-disk journaled in the disk-bracket and adapted to contact the engine pulley on either side of the pivot axis of said disk-bracket, and a plunger carried by the disk-bracket and adapted to frictionally contact said disk when the disk is not in frictional contact with the engine pulley.

5. A power steering-gear for traction engines comprising a friction-disk, means for supporting said disk adjacent the face of an engine-pulley with its axis substantially radial to said pulley, a plunger adapted to rest in frictional contact with said disk, means for swinging said disk in a plane substantially radial to the engine-pulley whereby the plunger will be withdrawn from contact with the disk and the disk will be brought into frictional contact with the face of the engine-pulley on either side of the axis of swing of the disk to rotate said disk in either direction, and a driving connection between the disk and steering mechanism of a traction engine.

6. A power steering-gear for traction engines comprising a disk-bracket, a friction-disk journaled therein, the disk-bracket being pivotally supported so as to bring the face of the disk adjacent the face of an engine-pulley, a plunger carried by the disk-bracket, means for yieldingly holding the plunger in frictional contact with said disk, means for swinging said disk-bracket on its pivot axis whereby the plunger is withdrawn from its frictional contact with the disk against the action of said yielding means and the disk is brought into frictional contact with the face of said engine-pulley on either side of said pivot axis, and a driving connection between the disk and steering mechanism of a traction engine.

7. A power steering-gear for traction engines comprising a rotatable friction-disk supported adjacent the face of an engine-pulley and adapted to be swung into and out of frictional contact with said pulley face to each side of the axis of swing of said disk to rotate the disk in opposite directions, a friction-stop adapted to stop the rotation of said disk when the disk has been disengaged from frictional contact with the pulley face, and a driving connection between the disk and the steering mechanism of a traction engine.

8. A power steering-gear for traction engines comprising a rotatable friction disk supported adjacent the face of an engine-pulley and adapted to be swung into and out of frictional contact with said pulley face to each side of the axis of swing of said disk to rotate the disk in opposite directions, a friction-stop adapted to stop the rotation of said disk when the disk has been disengaged from frictional contact with the pulley face, adjustable means adapted to vary the point at which the friction stop contacts the disk relative to said disengagement of the frictional contact between the disk and pulley face, and a driving connection between the disk and the steering mechanism of a traction engine.

9. A power steering-gear for traction engines comprising a rotatable disk supported adjacent the face of an engine-pulley and adapted to be swung into and out of engagement with said pulley to each side of the axis of swing of the disk to rotate the disk in opposite directions, a friction-stop adapted to stop the rotation of said disk when the disk has been disengaged from the pulley, and a driving connection between the disk and the steering mechanism of a traction engine.

In testimony whereof I have hereunto set my hand in presence of two subscribing witnesses.

HARRY C. CLAY.

Witnesses:
J. H. BACHTEL,
PERRY KING.

Copies of this patent may be obtained for five cents each, by addressing the "Commissioner of Patents, Washington, D. C."